United States Patent [19]

Ishiwari et al.

[11] Patent Number: 5,179,167

[45] Date of Patent: Jan. 12, 1993

[54] MELTABLE FLUORINE-CONTAINING RESIN COMPOSITION

[75] Inventors: Kazuo Ishiwari; Tsuyoshi Noguchi, both of Osaka, Japan

[73] Assignee: Daikin Industries, Ltd., Osaka, Japan

[21] Appl. No.: 417,303

[22] Filed: Oct. 5, 1989

[30] Foreign Application Priority Data

Oct. 7, 1988 [JP] Japan .................................. 63-254559

[51] Int. Cl.$^5$ ............................................. C08L 27/18
[52] U.S. Cl. ..................................... 525/200; 525/199
[58] Field of Search ................................ 525/199, 200

[56] References Cited

U.S. PATENT DOCUMENTS

| | | | |
|---|---|---|---|
| 3,484,503 | 12/1969 | Magner et al. | 525/200 |
| 3,969,435 | 7/1976 | Bailey et al. | 525/199 |
| 4,105,716 | 8/1978 | Sakai et al. | 525/276 |
| 4,555,543 | 11/1985 | Effenberger et al. | 525/200 |
| 4,713,418 | 12/1987 | Logothetis et al. | 525/200 |
| 4,749,752 | 6/1988 | Youlu et al. | 525/199 |
| 5,041,500 | 8/1991 | Ishiwari et al. | 525/200 |

FOREIGN PATENT DOCUMENTS

| | | |
|---|---|---|
| 0138524 | 4/1985 | European Pat. Off. |
| 0197781 | 10/1986 | European Pat. Off. |
| 0224037 | 6/1987 | European Pat. Off. |
| 829600 | 3/1960 | United Kingdom |

*Primary Examiner*—Carman J. Seccuro, Jr.
*Attorney, Agent, or Firm*—Birch, Stewart, Kolasch & Birch

[57] ABSTRACT

A meltable fluorine-containing resin composition comprising (A) a copolymer which has a molecular weight distribution peak in a lower molecular weight region and is selected from the group consisting of a tetrafluoroethylene/hexafluoropropylene copolymer and a copolymer of tetrafluorethylene and at least one fluorovinyl ether of the formula:

$$CF_2=CF-O-R_f$$

wherein $R_f$ is a fluoroalkyl group having 1 to 10 carbon atoms, and (B) a copolymer which has a molecular weight distribution peak in a higher molecular weight region and is selected from the group consisting of a tetrafluoroethylene/hexafluoropropylene copolymer and a copolymer of tetrafluoroethylene and at least one fluorovinyl ehter of the formula:

$$CF_2=CF-O-R_f$$

wherein $R_f$ is the same as defined above, which has good mechanical properties and molding properties.

4 Claims, 3 Drawing Sheets

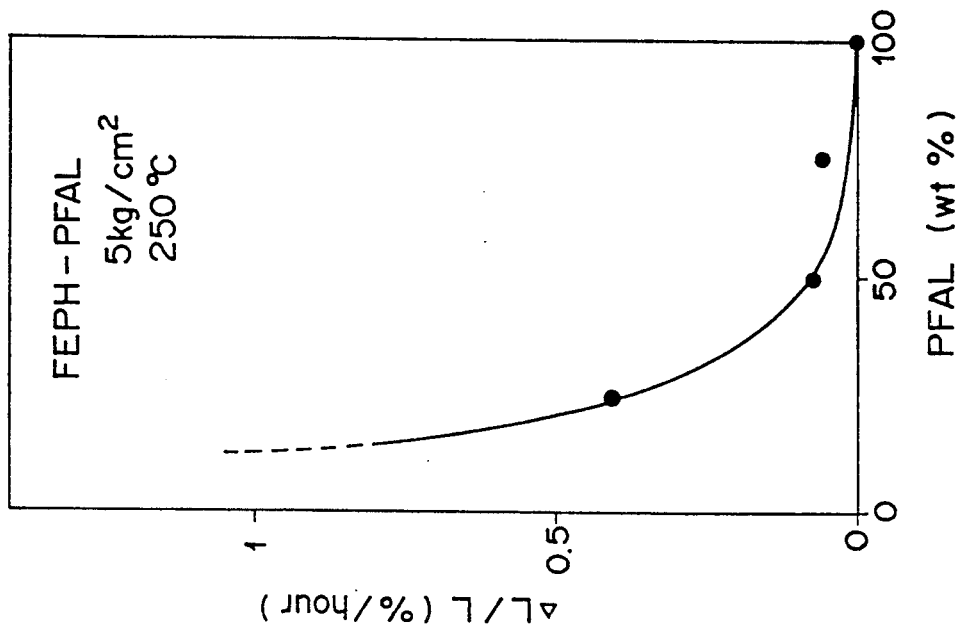
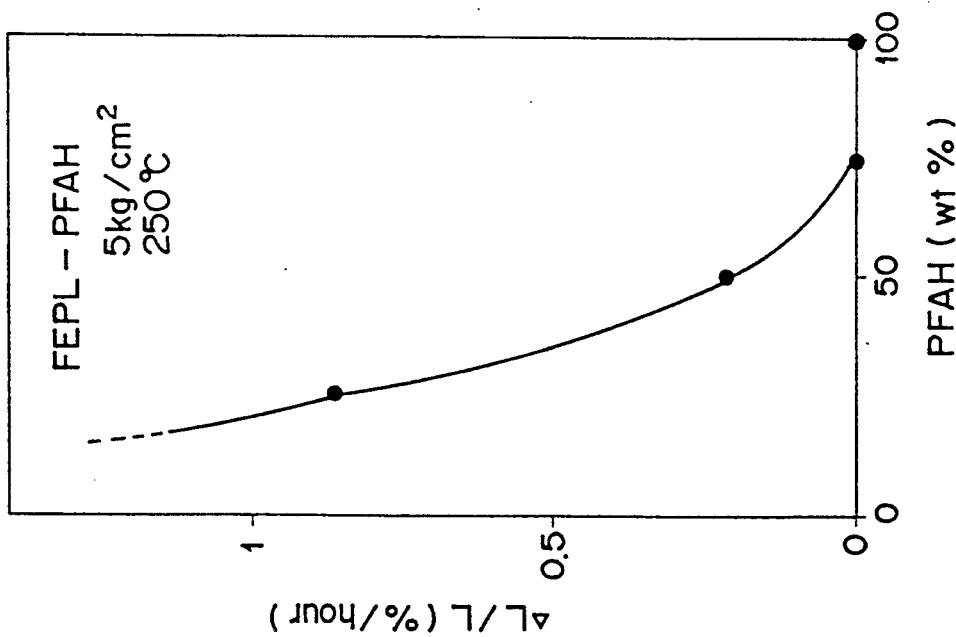

MELTABLE FLUORINE-CONTAINING RESIN COMPOSITION

BACKGROUND OF THE INVENTION

1. Field of the Invention

The present invention relates to a meltable fluorine-containing resin composition. More particularly, the present invention relates to a meltable fluorine-containing resin composition comprising at least two copolymers, each having a different molecular weight distribution. The copolymers are selected from tetrafluoroethylene/hexafluoropropylene copolymers and/or tetrafluoroethylene/fluorovinyl ether copolymers.

2. Description of the Related Arts

Blends of various polymers are attractive in view of improvement of properties or development of new properties of known polymers, and many polymer blends have been proposed.

However, no blend of meltable fluorine-containing polymers is known.

SUMMARY OF THE INVENTION

An object of the present invention is to provide a novel meltable fluorine-containing resin composition.

This and other objects are achieved by a meltable fluorine-containing resin composition comprising (A) a copolymer which has a molecular weight distribution peak in a lower molecular weight region and is selected from the group consisting of a tetrafluoroethylene/hexafluoropropylene copolymer (hereinafter referred to as FEP) and a copolymer of tetrafluoroethylene and at least one fluorovinyl ether of the formula:

$$CF_2=CF-O-R_f \qquad (I)$$

wherein $R_f$ is a fluoroalkyl group having 1 to 10 carbon atoms (hereinafter this copolymer will be referred to as PFA), and (B) a copolymer which has a molecular weight distribution peak in a higher molecular weight region and is selected from the group consisting of FEP and PFA.

BRIEF DESCRIPTION OF THE DRAWING

FIGS. 3 and 4 show the results of creep test in the Example, and

DETAILED DESCRIPTION OF THE INVENTION

Figure 2:
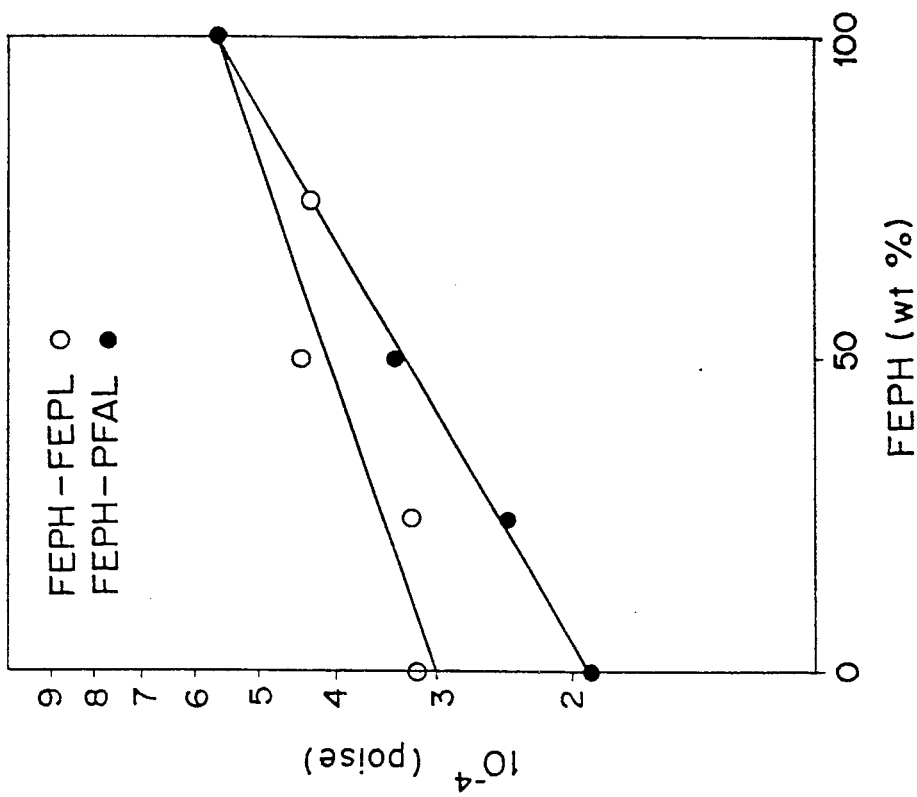
FIGS. 1 and 2 show melt viscosity measured in the Example.

FEP preferably comprises 96 to 83% by weight of tetrafluoroethylene and 4 to 17% by weight of hexafluoropropylene. PFA preferably comprises 99.5 to 92% by weight of tetrafluoroethylene and 0.5 to 8% by weight of the fluorovinyl ether (I).

The composition of the present invention preferably comprises 90 to 10% by weight of the copolymer (A) and 10 to 90% by weight of the copolymer (B), more preferably 80 to 20% by weight of the copolymer (A) and 20 to 80% by weight of the copolymer (B).

FEP or PFA having the molecular weight distribution peak in the lower molecular region is a copolymer which has lower melt viscosity measured under hereinafter described conditions. They preferably have melt viscosity (at 380° C.) of 5,000 to 280,000 poise. FEP or PFA having the molecular weight distribution peak in the higher molecular region is a copolymer which has higher melt viscosity measured under hereinafter described conditions. They preferably have melt viscosity (at 380° C.) of 25,000 to 300,000. The melt viscosity difference between the copolymer (A) and the copolymer (B) is preferably at least 20,000 poise, more preferably at least 40,000 poise. When the copolymer having the molecular weight distribution peak in the higher molecular region has melt viscosity of higher than 300,000 poise and is mixed with the copolymer having the molecular weight distribution peak in the lower molecular region, the blend has a little viscosity decrease in the composition range in which mechanical strength is not much decreased. When the copolymer having the molecular weight distribution peak in the lower molecular region has melt viscosity of lower than 5,000 poise, mechanical properties are not good. Measuring method of melt viscosity will be explained in the following Example.

FEP or PFA can contain other monomers in such an amount that other comonomers do not decrease the properties of FEP and PFA. Specific examples of the other monomer are hexafluoropropylene (in PFA), perfluoro($C_1$—$C_{10}$-alkyl vinyl ether) (in FEP), perfluoro-$C_1$—$C_{10}$-alkyl ethylene perfluoro-(alkyl allyl ether), and the compound of the formula:

$$CF_2=CF[OCF_2CFX(CF_2)_m]_nOCF_2(CF_2)_oY$$

wherein X is fluorine or trifluoromethyl, Y is halogen, m is 0 or 1 (when m is 1, X is fluorine), n is 0 to 5, and o is 0 to 2.

The copolymer (A) and the copolymer (B) are mixed by any of the conventional methods, for example, blended in the form of aqueous dispersions, blended in the form of organic solvent dispersions or blended in the form of dry powder or melt blended in melt extrusion.

Tensile strength at break increases by adding PFA and/or FEP of higher molecular weight to PFA and/or FEP of lower molecular weight. Although the melt viscosity slightly increases, the molding property is good, and mechanical properties are highly improved.

When the lower molecular weight copolymer is added to the higher molecular weight copolymer, the mechanical properties are maintained, the melt viscosity decreases according to a logarithmic mixing rule and the molding property is improved.

When PFA is added to FEP, the mechanical properties at high temperature are highly improved with a small amount of PFA. In the case of combination of higher molecular weight FEP and lower molecular weight PFA, the molding property of FEP is improved due to viscosity decrease and the properties at high temperature are improved.

In the case of composition of FEP and PFA, crystallization temperature is lowered apart from combination of molecular weights, crystallization rate is significantly reduced and crystallinity is decreased. As the result, molding temperature is easily controlled and dimensional change of the molded article is decreased. Less molding strain remains so that cracking of the molded article is suppressed. The composition of the present invention is suitable for molding thick-walled articles.

PREFERRED EMBODIMENTS OF THE INVENTION

The present invention is illustrated by the following Example.

EXAMPLE

The following higher molecular weight and lower molecular weight FEP and PFA were used:

PFA

Higher molecular weight copolymer (PFA-H)
Copolymer of 96.5% by weight of tetrafluoroethylene/3.5% by weight of perfluoropropyl vinyl ether
Melt viscosity: $8.1 \times 10^4$ poise
Melting point: 312° C.

Lower molecular weight copolymer (PFA-L)
Copolymer of 96.5% by weight of tetrafluoroethylene/3.5% by weight of perfluoropropyl vinyl ether
Melt viscosity: $1.9 \times 10^4$ poise
Melting point: 311° C.

FEP

Higher molecular weight copolymer (FEP-H)
Copolymer of 89.7% by weight of tetrafluoroethylene/10.3% by weight of hexafluoropropylene
Melt viscosity: $5.5 \times 10^4$ poise
Melting point: 266° C.

Lower molecular weight copolymer (FEP-L)
Copolymer of 88.2% by weight of tetrafluoroethylene/11.8% by weight of hexafluoropropylene
Melt viscosity: $3.1 \times 10^4$ poise
Melting point: 260° C.

The PFA or FEP higher molecular weight copolymer and the PFA or FEP lower molecular weight copolymer were fully mixed, in the form of powder in various ratios indicated in the Figures, melted and mixed at 350° C. to prepare blends. A Sheet was shaped from each blend to make specimens. Measurement of melt viscosity, creep test and measurement of tensile strength at break were carried out as follows.

Measurement of melt viscosity

A capillary flow test was carried out by using a capillograph manufactured by Toyo Seiki Seisakusyo.

A capillary having a diameter of 1.00 mm and a length of 20.00 mm was used and shear stress was measured at the measurement temperature of 380° C. and the shear rate of $6.08 \text{ sec}^{-1}$. Melt viscosity was calculated as a ratio of the shear stress to the shear rate.

Creep test

A thermal mechanical analysis equipment (TMA) manufactured by Rigaku Denki Kabusikikaisha was used.

Tensile load of 5 $kg/cm^2$ was applied to the specimen (width: 3 mm, length: 15 mm, thickness: about 0.2 mm) at 250° C. to measure elongation. The results are expressed by $\Delta L/L$.

Measurement of tensile strength at break

A stretch and compression machine manufactured by Sinko Tūsin Kougyou Kabusikikaisha was used.

The specimen (width: 10 mm, length: 60 mm, thickness: about 0.2 mm) was stretched at the stretch rate of 10 mm/min. to measure the tensile strength at break.

Figure 1:
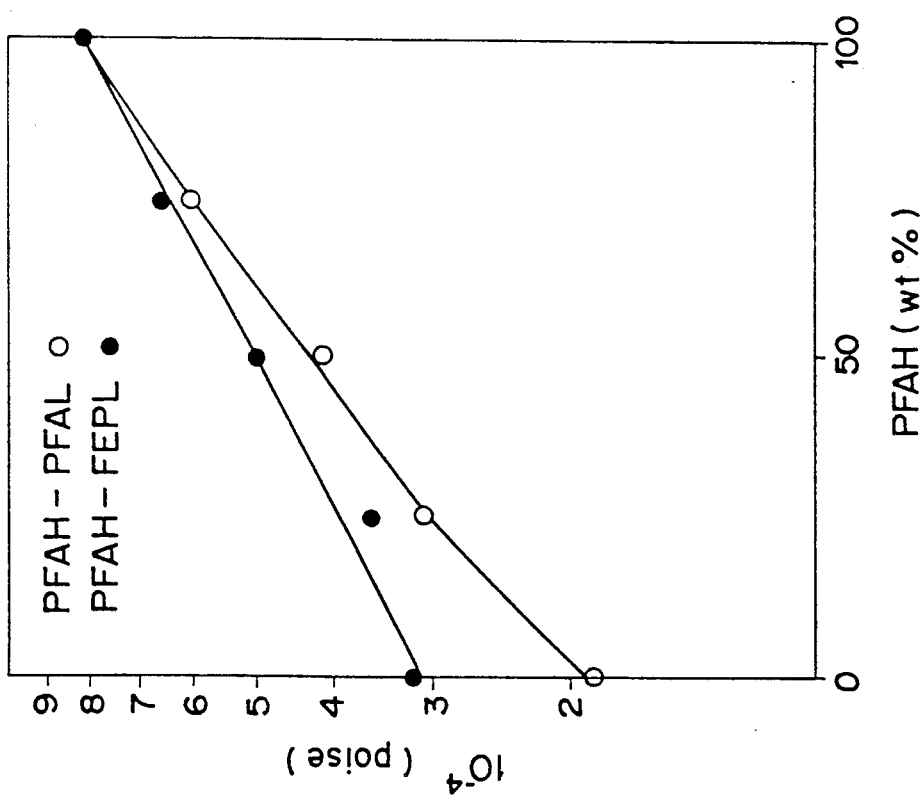
Figure 6:
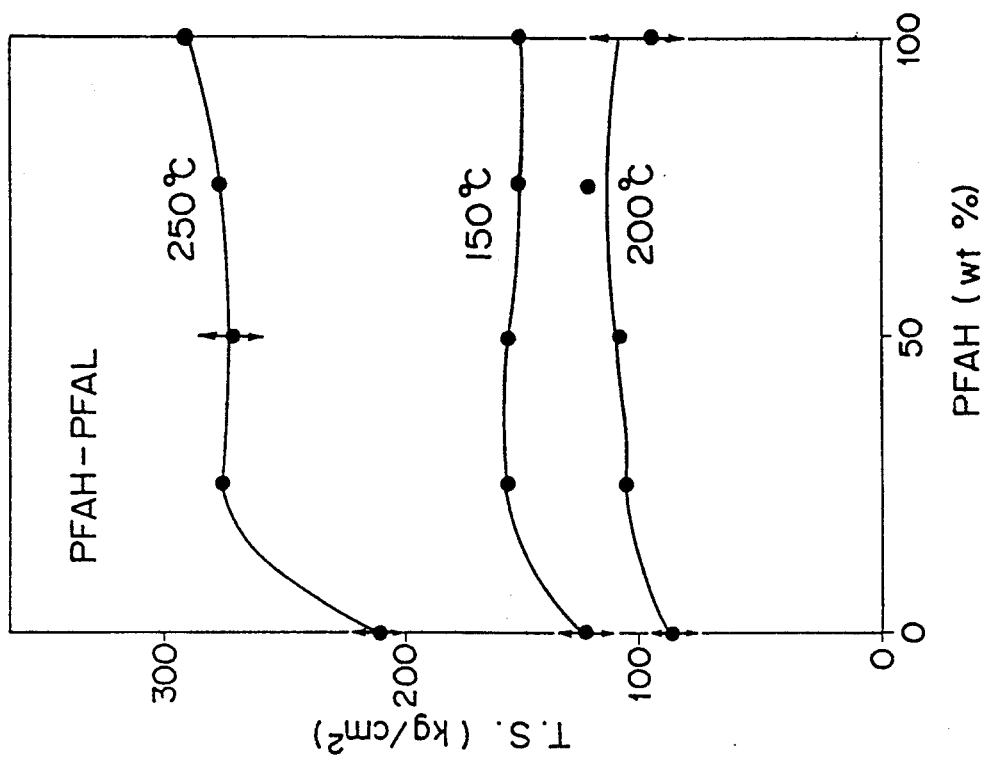
FIGS. 5 and 6 show tensile strength at break measured in the Example.
Figure 5:
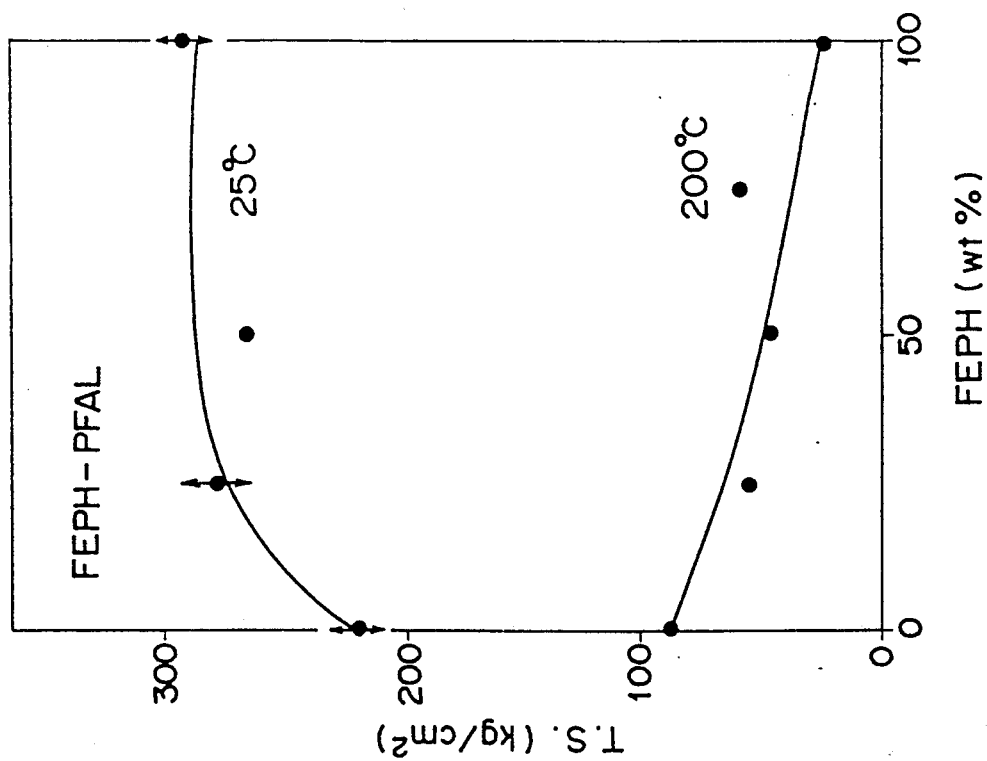

Results of melt viscosities are shown in FIGS. 1 and 2, results of creep test are shown in FIGS. 3 and 4, and results of tensile strength at break are shown in FIGS. 5 and 6.

What is claimed is:

1. A meltable fluorine-containing resin composition comprising (A) a copolymer which has a molecular weight distribution peak in a lower molecular weight region and is selected from the group consisting of a copolymer of 96 to 83% by weight of tetrafluoroethylene and 4 to 17% by weight of hexafluoropropylene and a copolymer of 99.5 to 92% by weight of tetrafluoroethylene and 0.5 to 8% by weight of at least one fluorovinyl ether of the formula:

$$CF_2=CF-O-R_f$$

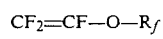

wherein $R_f$ is a fluoroalkyl group having 1 to 10 carbon atoms, and (B) a copolymer which has the molecular weight distribution peak in the higher molecular weight region and is selected from the group consisting of a copolymer of 96 to 83% by weight of tetrafluoroethylene and 4 to 17% by weight of hexafluoropropylene and a copolymer of 99.5 to 92% by weight of tetrafluoroethylene and 0.5 to 8% by weight of at least one fluorovinyl ether of the formula:

$$CF_2=CF-O-R_f$$

wherein $R_f$ is the same as defined above, which comprises 90 to 10% by weight of said copolymer (A) and 10 to 90% by weight of said copolymer (B), and wherein the melt viscosity of said copolymer (A) at 380° C. is 5,000 to 280,000 poise, the melt viscosity of said copolymer (B) at 380° C. is 25,000 to 300,000 poise, and the melt viscosity difference between said copolymer (A) and said copolymer (B) is at least 20,000 poise, wherein at least one of said (A) or (B) copolymer is a copolymer of tetrafluoroethylene and said fluorovinyl ether.

2. The meltable fluorine-containing resin composition according to claim 1, in which copolymer (A) comprises said copolymer of tetrafluoroethylene and at least one fluorovinyl ether and copolymer (B) comprises said copolymer of tetrafluoroethylene and at least one fluorovinyl ether.

3. The meltable fluorine containing resin composition according to claim 1, in which copolymer (A) comprises said tetrafluoroethylene/hexafluoropropylene copolymer and copolymer (B) comprises said copolymer of tetrafluoroethylene and at least one fluorovinyl ether.

4. The meltable fluorine containing resin composition according to claim 1, in which copolymer (A) comprises said copolymer of tetrafluoroethylene and at least one fluorovinyl ether and copolymer (B) comprises said tetrafluoroethylene/hexafluoropropylene copolymer.

* * * * *